United States Patent [19]

Tisserand et al.

[11] Patent Number: 4,633,813
[45] Date of Patent: Jan. 6, 1987

[54] MILKING AND FEEDING STALL

[75] Inventors: Philippe Tisserand, Paris; Jean-Pierre Daffini, Onet le Chateau 4 Saisons, both of France

[73] Assignee: R. J. Fullwood & Bland Ltd., Ellesmere, Great Britain

[21] Appl. No.: 741,063

[22] Filed: Jun. 4, 1985

[30] Foreign Application Priority Data

Jun. 4, 1984 [FR] France ................ 84 08733

[51] Int. Cl.$^4$ .............................................. A01K 1/12
[52] U.S. Cl. ............................................. 119/14.04
[58] Field of Search ................................... 119/14.04

[56] References Cited

U.S. PATENT DOCUMENTS 2,358,000  9/1944  Cornell .................. 119/14.04
3,810,442  5/1974  Jacob et al. ............. 119/14.04

FOREIGN PATENT DOCUMENTS 131121  6/1978  Fed. Rep. of Germany ... 119/14.04

Primary Examiner—Hugh R. Chamblee
Attorney, Agent, or Firm—Sughrue, Mion, Zinn, Macpeak and Seas

[57] ABSTRACT

This stall comprises an endless articulated floor (6) which slides along a horizontal sole element (10) and passes around horizontal rollers (2, 4) mounted on a frame (1). Retainer plates (14) are laterally mounted on the floor and troughs (16) fixed to the plates extend across the space (18) between two adjacent plates so as to be accessible. Each plate (14) also carries a rocker element (20) which closes the access to the trough, is pivotable downwardly by the animal which desires to reach the trough, but rises so as to prevent the animal from leaving the trough before the end of the milking operation.

9 Claims, 2 Drawing Figures

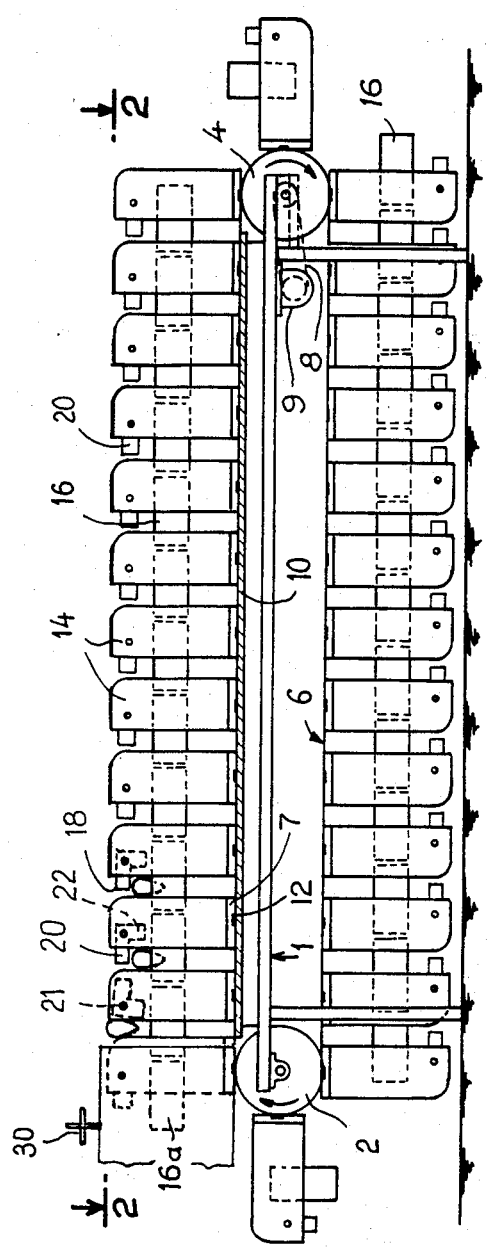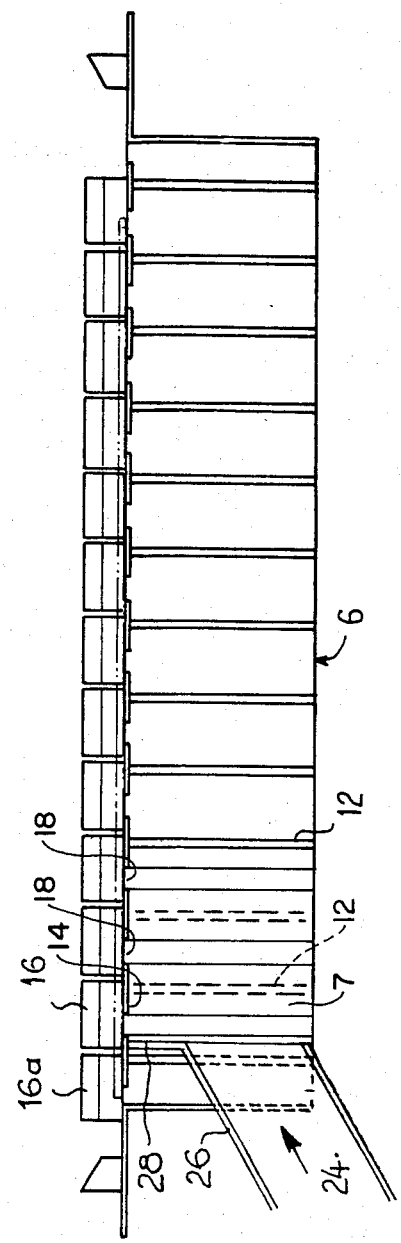

MILKING AND FEEDING STALL

It is well known that animals must be fed during the milking. Consequently, the milking stalls intended for sheep or other animals are usually linear stalls in which the animals are disposed side by side, a conveyor moving in front thereof for the purpose of continuously bringing the food thereto.

Further, it has been found that this manner of feeding creates serious problems since the displacement of the food disturbs certain animals while the amount of food presented thereto is irregular, since it is a function of the amount of food already taken by the preceding animals.

An object of the present invention is to overcome these drawbacks by providing a stall in which the animals are immobilized relative to the food presented thereto and relative to the milking device, but which permits the milking operation to be carried out in a continuous and substantially automatic manner.

The invention therefore provides a milking stall which comprises an endless articulated floor having an upper horizontal part which moves between an entrance for the animals to be milked and an exit for the milked animals and which is provided on one of its sides with retainers, each carrying, on one hand, a trough laterally offset relative thereto and, on the other hand, an element which closes the passage toward said trough and may be retracted downwardly but is constantly biased to a closing position.

Each animal arriving on the floor has easy access to the trough which is the closest to the entrance by tilting with its head the closing element but is then retained by the latter throughout the horizontal travel of the articulated floor. However, it is always possible for the cattle raiser to again tilt this element and to disengage the animal at an intermediate point.

Further, as the articulated floor constitutes an endless conveyor mounted on a frame, the troughs and the retainers are inverted when they pass under the frame so that any food remaining in the troughs is emptied and each animal receives a new dose which may be well determined.

The following description of an embodiment given by way of a non-limiting example and shown in the accompanying drawings will bring out the advantages and features of the invention.

In the drawings:

FIG. 1 is a diagrammatic elevational view of a milking stall according to the invention, and FIG. 2 is a plan view taken on line 2—2 of FIG. 1.

As shown in these drawings, a linear milking stall according to the invention comprises a frame 1 which may be merely placed on the ground or if desired provided with wheels so as to be movable. This frame 1 supports at each of its ends, guide means in the form of a roller, respectively 2 and 4, and an endless articulated floor 6 extends around these two rollers and is driven by the roller 4 which is connected, through a chain transmission 8, to a motor 9 carried by the frame 1. Preferably, the frame 1 also carries a flat and horizontal support in the form of a sole element 10 on which the articulated floor 6 slides when it is displaced horizontally by the driving roller 4. Thus the floor 6 has a first or upper part and a second or lower part which is connected to the upper part by transition parts extending around the rollers 2 and 4.

The articulated floor 6 includes evenly spaced apart cross-members 12 each of which carries a floor element 7 and, at one of its ends a vertical plate 14 constituting a retainer (known as a "cornadis" in France). On the side opposed to the cross-member 12, the plate 14 carries a laterally projecting trough 16. Each trough 16 extends as shown in the drawing, in the space between two adjacent plates 14 and slightly behind the neighbouring plate. Consequently, each trough 16 closes the space 18 between two plates 14 and is accessible through this space 18.

An entrance passageway 24 is mounted in the vicinity of one of the ends of the sole element 10 (at the left end as viewed in the drawing) and a partition wall 26, which extends this passageway 24 above the articulated floor, terminates in a side wall 28 which is parallel to the cross-members 12 and guides the animal toward the trough 16.

Mounted outside the articulated floor 6 and above the troughs 16 is a food distributor, merely diagrammatically indicated at 30 in FIG. 1, which fills the troughs 16a carried by the plate 14 masked by the partition wall 28, i.e. the first trough of the upper horizontal part of the floor 6.

It will be understood that milking devices of any suitable type are also mounted on the articulated floor in each of the spaces defined by the croos-members 12.

Further, guiding means for the animals leaving the stall may be provided at the end of the articulated floor opposed to the entrance 24. These means are of known type and have not been shown in order to avoid complicating the drawing.

Each space 18 is closed by a bar 20 which is pivotally mounted by pivot 21 on the upper part of the retainer plate 14 and projects laterally on the same side as the trough 16. In the illustrated embodiment, the bar 20 is rigid with an arm 22 which is substantially perpendicular thereto and is thus mounted as a rocker on the retainer plate 14. However, an abutment is provided above the retractable closing element thus formed to prevent in a reliable manner the raising of the bar 20 beyond its horizontal closing position.

Preferably, the closing element is mounted within the retainer plate 14 itself which is at least partly hollow and the upper edge portion of this retainer plate performs the function of the upper abutment.

When milking, the sheep, for example, are led through the passageway 24 and guided one by one by the partition wall 26 to the first space 18 and the first trough 16. The horizontal position of the bar 20 is slightly lower than the normal height of the head of a sheep.

The animal can pass its head above the bar 20 and, when it tries to reach the trough 16, it pushes this bar 20 downwardly and causes it to rock about the pivot pin 21, as shown in FIG. 1. When the animal has reached the trough, the bar 20 is released and the arm 22 rocks the closing element in the opposite direction and returns the bar 20 to the horizontal position above the head of the animal and applies it against the upper abutment.

The animal is thus immobilized and can no longer raise its head or leave the trough. The milking device is then brought into position and the articulated floor is driven by the roller 4 and displaces both the installed sheep, the corresponding retainer plates 14, the trough 16, and this milking device throughout the horizontal path of its upper part to the vicinity of the roller 4.

At this moment, the tilting of the retainer plate around the roller 4 also tilts the bar 20 and releases the animal which can now leave the stall.

It will be obvious to a person skilled in the art that an automatic unhooking device for the milking apparatus may be provided at this end of the articulated floor so that the milked animal can leave the stall without difficulty.

It will also be clear that, as the bar 20 projects into the space 18 above the head of the animal, it is always accessible from the exterior. Consequently, it is possible at any moment to intentionally exert a force thereon and rock it downwardly for releasing an animal at an intermediate point of the path without awaiting the tilting of the retainer plate 14.

At the end of their upper horizontal path, the retainer plates 14 which arrive at the right end of the stall tilt around the roller 4 and are then driven along the lower horizontal path of the endless floor. Throughout this travel, the troughs 16 carried thereby are inverted and any food remaining therein is discharged and may be if desired collected. At the other end, the pivoting around the roller 2 puts the retainer plate 14 back into an upright position and the trough 16 associated therewith is presented in a normal horizontal position under the food distributor 30. A suitable adjustment of this device enables a well-known given dose of food to be supplied to each animal, this food being if desired adapted to the particular animal for which it is intended.

The motor 9 may of course drive the articulated floor continuously at such speed that the time it takes to pass along the sole element 10 corresponds to the time required for the milking.

As a modification, the driving by means of the motor 9 may be effected in an alternating manner: a certain number of animals are placed in position along the moving articulating floor, then the latter is stopped during the milking, while the floor 6 is once again displaced to permit the exit of the already-milked animals.

Such a stall, which may be employed inside a stable or out in the open and considerably facilitates the milking by immobilizing the animals relative to their feeding troughs, also facilitates the raising of sheep, caprines, bovines or other animals by an individualized rationing of the food to each one thereof in the course of the milking or even independently of the latter, and affords great safety in that it permits at any moment the releasing of any one of the animals if necessary.

What is claimed is:

1. A milking and feeding stall comprising a frame, an endless floor having a longitudinally extending substantially horizontal first part and a longitudinally extending second part and two transition end parts interconnecting said first and second parts, the floor comprising floor elements articulated together, support means carried by the frame and supporting the first floor part, two guide means carried by the frame and guiding said transition floor parts, means combined with the floor for moving said first floor part in a longitudinal path between an entrance for the animals to be milked and an exit for the milked animals, which floor is provided on a lateral side thereof with retainer plates, each retainer plate being mounted on a respective floor element and extending upwardly of the respective floor element in said first floor part, the floor element extending from a side of the retaining plate transversely of the longitudinally extending first floor part, an individual trough carried by each retaining plate and offset longitudinally of said first floor part relative to the respective retainer plate and disposed on a side of the retainer plate opposed to the side of the retainer plate from which the respective floor element extends, and said retainer plates defining a passage between neighbouring retainer plates, which passage allows a head of an animal placed on said first floor part access to the respective individual trough, each retainer plate further carrying retractable closing means for closing said passage and movable between a passageclosing position and a retracted position in which latter position the closing means is substantially withdrawn from the passage, said closing means being freely movable to said retracted position by the animal to be fed, means interposed between the retainer plate and the closing means to prevent the animal from moving the closing means away from the closing position when the animal has its neck placed under the respective closing means, and means for constantly yieldably biasing said closing means to the closing position thereof.

2. A stall according to claim 1, wherein the closing means comprises a bar and pivot means for pivotally mounting the bar as a rocker in an upper part of the respective retainer plate, the bar laterally projecting on the same side of the retainer plate as the trough.

3. A stall according to claim 1, wherein said second floor part is located below and spaced from said first floor part and said two guide means comprise rollers carried by the frame, said transition parts of said floor extending around said rollers so that said troughs tilt about axes of rotation of said rollers when they reach said rollers and are inverted and emptied during their travel in said second floor part between said rollers.

4. A stall according to claim 1, wherein said support means comprise a planar sole element mounted on said frame, said first floor part being in sliding contact with said planar sole element.

5. A stall according to claim 1, wherein a cross-member extending transversely of said longitudinally extending first floor part is fixed to each retainer plate and carries a respective floor element, said retainer plate being substantially vertical and said trough carried by said substantially vertical retainer plate extends longitudinally of said first floor part to a position just behind a leading edge of the adjacent retainer plate relative to the direction of said movement of said first floor part.

6. A stall according to claim 1, wherein a transverse partition wall for guiding the animals to be milked extends said entrance.

7. A stall according to claim 1, comprising a food distributor mounted adjacent an upstream end of said first floor part, relative to the direction of movement of said first floor part, above a first upwardly facing trough in said first floor part.

8. A stall according to claim 1, wherein the means for preventing the closing means from moving away from said closing position comprise an abutment mounted on the retainer plate and cooperative with said closing means for preventing the movement of the closing means away from said closing position which latter position is substantially horizontal.

9. A stall according to claim 8, wherein the closing means is mounted within the respective retainer plate which is hollow and has an upper wall closing the hollow and constituting said abutment, the respective closing means abutting in its substantially horizontal closing position against said upper wall of the retainer plate.

* * * * *